United States Patent [19]

Minagawa et al.

[11] 4,134,868
[45] Jan. 16, 1979

[54] AROMATIC CARBOXYLIC ACID ESTER STABILIZERS FOR PVC RESINS

[75] Inventors: Motonobu Minagawa, Kosigaya; Tetsuo Sekiguchi, Hasuda; Kouji Tsuruga, Ohmiya, all of Japan

[73] Assignee: Argus Chemical Corporation, Brooklyn, N.Y.

[21] Appl. No.: 766,073

[22] Filed: Feb. 7, 1977

[51] Int. Cl.² ............................ C08K 5/12; C08K 5/10
[52] U.S. Cl. ................................. 260/23 XA; 252/406;
260/45.75 R; 260/45.85 R; 260/45.85 A;
260/45.85 T; 260/45.85 S; 260/45.85 P;
260/45.85 B
[58] Field of Search ................... 260/23 XA, 45.85 R,
260/31.6, 45.85 T, 45.85 B, 45.85 A, 45.75 R,
45.85 S, 45.75 T, 45.75 W; 252/406

[56] References Cited
U.S. PATENT DOCUMENTS 3,285,855  11/1966  Dexter et al. .................. 260/45.85 S

*Primary Examiner*—V. P. Hoke
*Attorney, Agent, or Firm*—Otto S. Kauder

[57] ABSTRACT

A stabilizer composition is disclosed that enhances the resistance to deterioration upon heating of vinyl chloride polymers. The stabilizer composition comprises (A) a metal salt of a non-nitrogenous monocarboxylic acid or hydrocarbon-substituted phenol and (B) an aromatic carboxylic acid ester of a polyhydric alcohol having at least two alcoholic hydroxyl groups in a polyhydric alcohol aromatic carboxylic acid ester group.

Vinyl chloride polymer compositions stabilized with the above disclosed stabilizer composition are also disclosed.

15 Claims, No Drawings

AROMATIC CARBOXYLIC ACID ESTER STABILIZERS FOR PVC RESINS

BACKGROUND OF THE INVENTION

This invention relates to a new stabilizer composition for enhancing the resistance to deterioration upon heating of vinyl chloride polymers, and to vinyl chloride polymers having enhanced resistance to deterioration in initial color, heat stability and clarity as a result of incorporating therein a stabilizer composition according to this invention.

There is a voluminous literature on the stabilization of vinyl chloride polymers. Patent disclosures of materials stated to be useful in minimizing deterioration of vinyl chloride polymers on heating number well over one thousand. Among the more important heat stabilizers in commercial use are mild alkalis such as sodium carbonate, disodium phosphate, and sodium and potassium salts of partially esterified phosphoric acids; carboxylates and phenolates of zinc, cadmium, and the alkaline earth metals; inorganic and organic lead salts; organotin carboxylates, as disclosed by Quattlebaum in U.S. Pat. No. 2,307,157; organotin mercaptides as disclosed by Leistner in U.S. Pat. Nos. 2,641,588 and 2,641,598; various metal-free organic compounds such as the polyols, e.g. mannitol, sorbitol, glycerol, pentaerythritol, organic phosphites, 1,2-epoxides, e.g., soybean oil epoxide, isooctyl epoxystearate, and the diglycidyl ether of 2,2-bis(p-hydroxyphenyl) propane, and nitrogen compounds, e.g., phenylurea, N,N'-diphenylthiourea, and 2-phenylindole. For detailed discussion of heat stabilizers for vinyl halide resins, reference may be made to the articles, L. I. Nass, in "Encyclopedia of Polymer Science and Technology" (N. Bikales, ed.) Vol. 12, pages 737 to 768 (1970); N. L. Perry "Barium-Cadmium Stabilization of Polyvinyl Chloride," *Rubber Age* 85 449-452 (June, 1959), and by H. Verity-Smith, *British Plastics* 27 176-179, 213-217, 307-311 (1954); the brochure by the same author *The Development of the Organotin Stabilizer* (Tin Research Institute, 1959) and the book *La Stabilisation des Chlorures de Polyvinyle* by F. Chevassus (Amphora, Paris, 1957).

The earliest disclosure of polyhydric alcohol containing stabilizers in vinyl chloride polymers is believed to be by R. Lally in U.S. Pat. No. 2,711,401 of July 21, 1955. Lally disclosed "a new composition of matter comprising in admixture of from 1 to about 5 parts of a organo-salt of a metal selected from the class of magnesium, calcium, strontium, barium, zinc, cadmium, mercury, tin and lead and from about 1 to about 5 parts of a compound selected from the class of aliphatic polyhydric alcohols having at least two and not more than nine hydroxyl groups and a boiling point not less than 250° F., esters of aliphatic polyhydric alcohols said esters having at least two and not more than nine hydroxyl groups and a boiling point not less than 250° F., and ethers of aliphatic polyhydric alcohols said ethers having at least two and not more than nine hydroxyl groups and a boiling point not less than 250° F.", and rephrased this disclosure in simpler language as "the stabilizer of this invention is an admixture of a metallic soap and a aliphatic polyhydric compound." Lally lists the polyhydric compounds which he had found particularly useful as glycol, glycerol, sorbitol, pentaerythritol, glyceryl mono-stearate, glyceryl mono-oleate, glycol diethyl ether and glyceryl monophenyl ether, and in one example discloses as stabilizer an admixture of one part of glyceryl mono-stearate with one part of cadmium 2-ethylhexoate. Thus wherever Lally discloses a polyhydric alcohol ester it is an ester of an aliphatic acid.

Polyhydric alcohol containing stabilizers are also disclosed by S. Elliott in U.S. Pat. Nos. 2,861,052 of Nov. 18, 1958 and 2,918,451 of Dec. 22, 1959. Both Elliott's disclosures specify that the polyhydric alcohol is a primary aliphatic polyhydric alcohol having a boiling point at least 250° F. and at least three hydroxyl groups of which at least two hydroxyl groups are free. Intimately admixed with the primary polyhydric alcohol Elliott in U.S. Pat. No. 2,861,052 disclosed a colorless Friedel-Crafts type catalyst, such as a halide of antimony, zinc, tin, titanium, zirconium, beryllium, boron, cadmium, and bismuth, and in U.S. Pat. No. 2,918,451, a colorless Friedel-Crafts type catalyst cation progenitor, such as an oxide, carbonate, hydroxide or carboxylic acid salt of the recited metals, together with an acid acceptor. In both disclosures Elliott states that the alcohols as defined can have ether or ester groups attached thereto, without disclosing or exemplifying any such ethers or esters. Elliott further points out that polyhydric alcohols with secondary or tertiary OH groups, even along with some primary OH groups, are undesirable. A. Hecker in U.S. Pat. No. 3,285,868 of Nov. 15, 1966 disclosed a stabilizer composition comprising a hydrocarbon substituted phenol and a polyvalent metal salt of a non-nitrogenous monocarboxylic acid along with a polyhydric alcohol of a certain structure to reduce or prevent a yellow tint introduced by the phenol in these compositions and further extend the stabilization obtained with a given amount of phenol and fatty acid salt. The polyhydric alcohols have the structure $RCH_2C(CH_2OH)_3$ where R is hydrogen or an alkyl or alkoxy group. The alkyl or alkoxy group may include hydroxyl or hydroxyalkyl groups. Polyhydric alcohols in Hecker's stabilizer composition include dipentaerythritol, tripentaerythritol, bis(trimethylolpropyl) ether, trimethylolpropane and trimethylolbutane, while pentaerythritol, glycerol, ethylene glycol, mannitol and sorbitol are deemed unsatisfactory. There is no disclosure of polyhydric alcohol esters by Hecker.

Another stabilizer composition comprising metal salts and polyhydric alcohols is disclosed by J. Scullin in U.S. Pat. No. 3,390,112 of June 25, 1968. Scullin's composition includes particularly polyhydric alcohols characterized as unsatisfactory by Elliott or Hecker or both, such as pentaerythritol, sorbitol, mannitol, methyl glucoside, and a polymeric polyhydric alcohol, together with a phenol and a barium and a cadmium salt, one of which has an aromatic anion and one an aliphatic anion. There is no disclosure of polyhydric alcohol esters in Scullin's patent. M. Gattenby in U.S. Pat. No. 3,479,308 of Nov. 18, 1969 disclosed plasticized vinyl chloride polymers comprising a combination of 2-6 carbon polyhydric alcohol partial fatty acid ester and polyethoxylated 2-6 carbon polyhydric alcohol partial fatty acid ester in relative proportions of 1 to 15 parts of the first ester to 0.5 to 10 parts of the second ester. The advantage of the selected polyhydric alcohol fatty acid esters is stated to be an improvement in antifogging properties of the plastic composition, that is the ability to cause moisture to condense on the plastic in the form of a transparent film instead of undesirable droplets or fog. Nothing is disclosed by Gattenby of a relationship between antifogging properties and heat stability of the vinyl chloride polymer composition, and in fact certain polyhydric alcohol fatty acid esters used by Gattenby have a deleterious effect on heat stability.

A. Hecker in U.S. Pat. No. 3,558,537 of Jan. 26, 1971 disclosed a stabilizer composition capable of increasing the resistance of polyvinyl chloride both to heat deterioration and to fogging comprising a zinc salt of a monocarboxylic acid and a partial ester of a polyglycerol with an unsaturated aliphatic monocarboxylic acid, not more than 75% of the hydroxyl groups of the polyglycerol being esterified.

Tenneco Chemicals' British Pat. No. 1,077,108 of July 26, 1967 discloses a stabilized vinyl halide resin containing an inorganic filler and a stabilizer comprising an organic nitrogen compound having three nitrogen atoms linked to one carbon atom and an anhydride of a polycarboxylic acid. As an additional non-essential ingredient, a polyhydric alcohol having 4 or more hydroxyl groups can be included. There is no disclosure of polyhydric alcohol esters in this patent.

Tenneco Chemicals' British Pat. No. 1,163,750 of Sept. 10, 1969 discloses a stabilized vinyl halide resin containing a metal silicate filler and a polyhydric alcohol, such as ethylene glycol, neopentyl glycol, trimethylolpropane, 1,2,6-hexanetriol, methyl glucoside, pentaerythritol, sorbitol or mannitol. There is no disclosure of polyhydric alcohol esters in this patent.

Kureha Kagaku's British Pat. No. 1,140,652 of Jan. 22, 1969 discloses improved vinyl chloride polymer compositions stabilized with a zinc, calcium, or magnesium fatty acid salt, a polyhydric alcohol, such as sorbitol, mannitol, and pentaerythritol, and to improve the compatibility and clarity of the composition a fatty acid ester of sucrose.

When this art is considered as a whole, it is evident that the record of polyhydric alcohol utilization in vinyl chloride polymer stabilizers encompasses both successes and unsolved problems. There remains a need for an economical ingredient of a stabilizer composition that would maintain the favorable properties of polyhydric alcohols and overcome the drawbacks repeatedly noted in the art.

SUMMARY OF THE INVENTION

In accordance with this invention, a stabilizer composition capable of enhancing the resistance to deterioration of a vinyl chloride polymer in initial color, clarity, and heat stability upon heating at 175° C. comprises (A) at least one metal salt of a non-nitrogenous monocarboxylic acid having 5 to 24 carbon atoms or a hydrocarbon-substituted phenol having 10 to 30 carbon atoms, and (B) at least one aromatic carboxylic acid ester of a polyhydric alcohol having one to four carboxylic acid ester groups and at least two free alcoholic hydroxyl groups in a carboxylic acid polyhydric alcohol ester group. For each 100 parts by weight of vinyl chloride polymer being stabilized, the quantity of stabilizer composition used suitably provides 0.01 to 5 parts by weight of the metal salt and 0.01 to 5 parts by weight of the aromatic carboxylic acid polyhydric alcohol ester.

DESCRIPTION OF PREFERRED EMBODIMENTS

The metal salt component of the stabilizer component is preferably a salt of a bivalent non-transition metal, such as barium, cadmium, calcium, magnesium, strontium, stannous tin, and zinc. Four-valent tin with two of the four valences linked through carbon to alkyl groups, i.e. dialkyltin salts such as dimethyltin, di-n-butyltin, di-isobutyltin, di-2-ethylhexyltin and di-n-octyltin carboxylates and substituted phenolates, are also among the preferred metal salts in the stabilizer composition according to this invention. In the salt, the acid can be any organic non-nitrogenous mono-carboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with non-reactive groups, such as halogen, sulfur and hydroxyl. By the term "alicyclic" it will be understood that there is intended any cyclic acid in which the ring is non-aromatic and composed solely of carbon atoms, and such acids may if desired have inert, non-reactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have non-reactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, 3,5,5-trimethyl hexoic acid, capric acid, neodecanoic acid, undecyclic acid, lauric acid, myristic acid, palmitic acid, margaric acid, stearic acid, oleic acid, ricinoleic acid, behenic acid, chlorocaproic acid, hydroxy-capric acid, ethyl acetoacetic acid, benzoic acid, phenylacetic acid, butylbenzoic acid, ethylbenzoic acid, propylbenzoic acid, hexylbenzoic acid, salicyclic acid, naphthoic acid, 1-naphthalene-acetic acid, orthobenzoyl benzoic acid, naphthenic acids derived from petroleum, abietic acid, dihydroabietic acid, hexahydrobenzoic acid, and methyl furoic acid, as well as partially esterified dibasic acids such as monobutyl phthalate, isooctyl maleate, ethylene glycol maleate, and 2-ethoxy ethylmaleate.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

In combination with the above metal salts of organic acids, or in lieu thereof, a metal salt of a hydrocarbon-substituted phenol can be used. The hydrocarbon substituents contain from four to twenty-four carbon atoms each. The metal can be an alkali metal or alkaline earth metal such as sodium, potassium, lithium, calcium, strontium, magnesium and barium. Among such polyvalent metal phenolates there can be mentioned the magnesium, barium, calcium, strontium, tin and zinc salts of n-butyl phenol, isoamyl phenol, isooctyl phenol, 2-ethylhexyl phenol, t-nonyl phenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, ortho or para phenyl phenol. The metal phenolate should be compatible with the halogen-containing resin.

Mixtures of salts of various metals can be used, and many such mixtures are known to give enhanced effects, such as mixed zinc and tin salts with the alkaline earth metal salts, e.g., barium and zinc stearates, as in U.S. Pat. No. 2,446,976.

The aromatic carboxylic acid polyhydric alcohol ester is characterized by a carbocyclic aromatic ring, preferably a single benzene ring, to which is linked at least one carboxyl group through a bivalent link that can be a single carbon-carbon bond; an alkylene group, an ether-alkylene group, and a thioether-alkylene group having in each case 1 to about 4 carbon atoms. The aromatic ring can carry one to four carboxylic acid groups, at least one of which is esterified with a polyhydric alcohol so that the ester has at least two alcoholic hydroxyl groups. The remaining substituents on the aromatic ring can be hydrogen, halogen atoms, hydroxyl and amino groups, and organic groups of 1 to about 4 carbon atoms such as alkyl, alkoxyl, carbamoyl, carboxyl, and carboxyalkyl groups. All substituents need not be the same.

The esterifying polyhydric alcohol of the aromatic carboxylic acid polyhydric alcohol ester has 3 to about 10 carbon atoms and 3 to 6 alcoholic hydroxyl groups. The polyhydric alcohol can be an open chain or a carbocyclic alcohol.

Accordingly, the aromatic carboxylic acid polyhydric alcohol ester can be an ester of, for example, benzoic, toluic, p-t-butylbenzoic, 2,4-dichlorobenzoic, p-aminobenzoic, m-hydroxybenzoic, salicylic, p-ethoxybenzoic, phthalic, isophthalic, terephthalic, trimellitic, hemimellitic, trimesic, pyromellitic, prehnitic, mellophanic, phenylacetic, p-chlorophenylthioacetic, hydrocinnamic, 3(3'-di-t-butyl-4'-hydroxybenzylthio)propionic, and 3(3',5'-di-t-butyl-4'-hydroxyphenyl)propionic acid with glycerol, 1,2,4-butanetriol, erythritol, xylitol, trimethylolethane, trimethylolpropane, pentaerythritol, 1,2,6-hexanetriol, sorbitol, mannitol, dulcitol, inositol, and 2,2,6,6-tetramethylolcyclohexanol. Particularly useful and preferred esters include glycerol monobenzoate, bis(sorbitol) isophthalate, mono-mannitol phthalate, mono-pentaerythritol p-toluate, and 2,2,6,6-tetramethylolcyclohexanol salicylate.

The aromatic carboxylic acid polyhydric alcohol ester can be represented by the formula

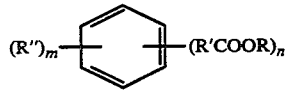

in which R is a hydroxyhydrocarbon group having 2 to 5 alcoholic hydroxyl groups and 3 to 10 carbon atoms; R' is a bivalent linking group that can be a single bond, an alkylene group, an ether alkylene group, and a thioalkylene group having 1 to 3 carbon atoms; R" is an inert substituent that can be a halogen atom, a lower alkyl group, a lower alkoxyl group, a hydroxyl group, a hydroxyalkyleneoxy group having 2 to 3 carbon atoms, a carboxyl group, a carboxyalkyl group, an amino group, and a carbamoyl group; m is an integer from zero to 5; n is an integer from 1 to 4, and the sum of m + n cannot exceed 6.

Aromatic carboxylic acid polyhydric alcohol esters represented by this formula are known and useful techniques are available for their preparation. Thus the isomeric glycerol 1-monobenzoate and 2-monobenzoate have been described by E. Baer in Canadian Jounal of Research, 1943, Vol. 21B, pages 119-124, and P. Verkade in Recueil de Travaux Chimiques, 1942, Vol. 61, pages 831-841 respectively. Trimethylolethane monobenzoate has been prepared by direct esterification according to B. Bolton in U.S. Pat. No. 3,067,158 of Dec. 4, 1962. Cyclic anhydrides such as phthalic anhydride, trimellitic anhydride, and pyromellitic dianhydride react with polyhydric alcohols under mild conditions, i.e. without catalyst at temperatures in the 80°-150° C. range, in the proportions of one mole of polyhydric alcohol per mole of anhydride group to give the polyhydric alcohol ester carboxylic acids represented by formulae I, II, and III from phthalic, trimellitic, and pyromellitic anhydrides respectively, where R represents a hydroxyhydrocarbon groups with 2 to 5 alcoholic hydroxyl groups as indicated above.

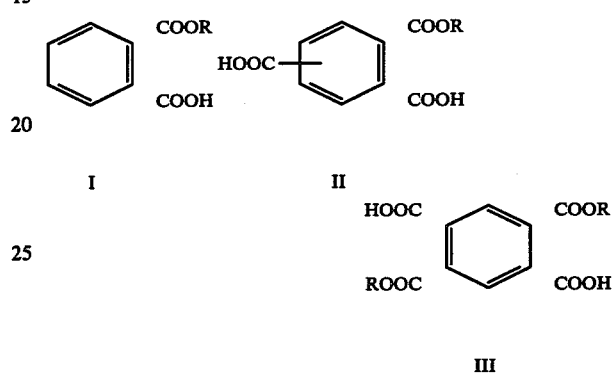

Esters such as those represented by formulae I, II, III have both free carboxylic acid groups and alcoholic hydroxyl groups and under certain conditions can react by both intramolecular and intermolecular esterification, but under the above indicated conditions of preparation and use in stabilizer compositions of this invention such reactions occur at most to a small extent and do not interfere with the usefulness of such esters.

Polyhydric alcohol esters of aromatic carboxylic acids that do not readily form cyclic anhydrides can be prepared by direct esterification of the carboxylic acids as well as by transesterification of lower alkyl esters of an aromatic carboxylic acid with the desired polyhydric alcohol, suitably in the presence of a catalyst and if desired an activating solvent such as hexamethylphosphoramide, tetramethylurea, dimethyl sulfoxide, and dimethylformamide. Suitable catalysts include alkaline materials such as potassium carbonate, sodium hydroxide, barium oxide, sodium methylate, potassium t-butoxide, potassium cyanide, and sodium sulfide; metallic oxides and salts such as litharge, lime, stannous chloride, oxalate, and oxide, zinc and manganese acetates and benzoates; metal organic compounds such as dimethyltin oxide, dibutyltin oxide, dibutyltin dilaurate, cobalt naphthenate, lead 2-ethylhexoate, mixed "rare earth" metal acetylacetonates, aluminum and titanium alkoxides, as well as powdered metals and alloys including antimony, germanium, titanium, zinc, cadmium, and manganese. For details of such preparations of aromatic carboxylic acid polyhydric alcohol esters British Pat. Nos. 991020 and 1236477 can be consulted. The following examples illustrate without limiting convenient ways to prepare an aromatic carboxylic acid polyhydric alcohol ester component of the stabilizer composition of this invention by transesterification of a methyl ester both with and without a solvent being used.

SYNTHETIC EXAMPLE: 1

Sorbitol-benzoic acid ester

Sorbitol 182g and methyl benzoate 136g were weighed in a four-necked flask, potassium carbonate 2.0g added as catalyst, stirred vigorously, heated up to 180–200° C. and reacted for ca. 3 hours. The reaction's end was the point at which the calculated amount of methanol was distilled off and the solution was homogeneous. After methanol was removed completely at 200° C. under reduced pressure, the product was taken off. This reaction product was a yellow sticky material with hydroxyl value 940 (calculated hydroxyl value 981).

SYNTHETIC EXAMPLE: 2

Di(pentaerythritol) terephthalic acid ester

Dimethyl terephthalate 19.7g, pentaerythritol 27.2g and dimethylformamide 30g as solvent were weighed and there was added 0.2g of potassium carbonate as catalyst. After reacting for 2 hours at 140–150° C., the calculated amount of methanol was distilled off and the solution was homogeneous. When dimethylformamide was removed at 150°–180° C. under reduced pressure, a light yellow sticky material was obtained. The product was crushed to powder after cooling. The melting point was 100–120° C. and hydroxyl value 790 (calculated hydroxyl value 838).

Usually, only a relatively small proportion of the stabilizer composition of this invention gives a noticeable improvement in heat stability and initial color. The usual amounts employed, based on total weight of resin, are within the range from about 0.02 to 10%, preferably 0.1 to 2%. Larger amounts, while generally not detrimental to the quality of the product, will be wasteful.

The stabilizer composition of this inventon is applicable to any vinyl chloride polymer. The term "vinyl chloride polymer" as used herein is inclusive of any polymer formed at least in part of the recurring group,

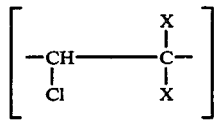
(II)

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also afterchlorinated polyvinyl chlorides as a class, for example, those disclosed in British Pat. No. 893,288 and also copolymers of vinyl chloride in a major proportion and other copolymerizable monomers in a minor porportion, such as copolymers of vinyl chloride and vinyl acetate, copolymers of vinyl chloride with maleic or fumaric acids or esters, and copolymers of vinyl chloride with acrylonitrile, 1-butene, propylene, ethylene, 1-hexene, or vinyl n-dodecyl ether. The invention also is applicable to mixtures of polyvinyl chloride in a major proportion with a minor proportion of other synthetic resins such as chlorinated polyethylene or copolymers of acrylonitrile with butadiene and styrene.

The invention is of application to the stabilization of rigid polyvinyl chloride resin compositions, that is, resin compositions which are formulated to withstand high processing temperatures, of the order of 190° C. and higher, and of plasticized polyvinyl chloride resin compositions of conventional formulation where resistance to heat distortion is not a requisite. The respective definitions of rigid and plasticized resins are as follows. The rigid resins are those resins to which plasticizers are not added, and which are generally worked at about 190° C. The ASTM definition (1961 D-883, Part 9, page 804) is as follows:

"a plastic which has a stiffness or apparent modulus of elasticity greater than 7000 grams per square centimeter (100,000 psi) at 23° C."

The plasticized resin would therefore have a modulus of elasticity of less than 7000 grams per square centimeter, and would have added to it the plasticizer compound. Conventional plasticizers well known to those skilled in the art can be employed such as, for example, dioctyl phthalate, octyl diphenyl phosphate and epoxidized soybean oil.

The stabilizer combinations of this invention are effective in improving initial color and heat stability of polyvinyl chloride resins in the absence of any other additives. However, it has long been recognized that polyvinyl chloride resins containing several types of heat stabilizers are better protected than those containing only one heat stabilizer. It is therefore an important aspect of this invention that these stabilizer combinations when used with additional heat stabilizers, provide greatly improved resistance to heat degradation not obtainable with the other heat stabilizers alone.

Preferred classes of additional stabilizers that can be used include the phenols, aliphatic polyhydroxy compounds and organic phosphites; 1,2-epoxide compounds; amides, and hydrazides of thioalkylenedicarboxylic acids and nitrilotrialkylenetricarboxylic acids; ketoacetic acid compounds; and organic nitrogen compounds such as the esters of betaaminocrotonic acid, diphenylthiourea, and 2-phenylindole. Phenol stabilizers can be included with the stabilizer composition of this invention in amounts corresponding to 0.01 to about 0.2 parts per parts of polymer being stabilized. Typical phenol stabilizers are butylated hydroxy-toluene (BHT) 4,4'-isopropylidenebisphenol, and 1,1,3-tris(2'methyl-4'-hydroxy-5'-t-butylphenyl)butane. A comprehensive disclosure of phenol stabilizers at column 16 line 49 to column 21 line 8 of M. Minagawa U.S. Pat. No. 3,849,370 issued November 19, 1974 is here incorporated by reference.

Aliphatic polyhydroxy compounds can be included with the stabilizer composition of this invention in amounts corresponding to 0.1 to about 1 part per 100 parts of polymer being stabilized. Typical aliphatic polyhydroxy compounds are glycerol, polyglycerol, mono-, di-, and tri-pentaerythritol, mannitol, sorbitol, and partial esters of these with saturated and unsaturated fatty acids having 6 to 22 carbon atoms.

Organic phosphite stabilizers can be included with the stabilizer composition of this invention in amounts corresponding to 0.05 to about 2 parts by weight per 100 parts by weight of polymer being stabilized. Typical phosphite stabilizers are triphenyl phosphite, diphenyl phosphite, tris(nonylphenyl) phosphite, 2-ethylhexyl diphenyl phosphite, diisodecyl phenyl phosphite, trinonyl phosphite, and pentaerythritol bis(n-octadecyl phosphite). The phosphite stabilizer can have one or a plurality of phosphite ester groups and from 10 to about 75 carbon atoms. A comprehensive disclosure of organic phosphite stabilizers at column 13 line 63 to column 15 line 48 of M. Minagawa U.S. Pat. No. 3,849,370 is here incorporated by reference.

Oxirane or 1,2-epoxide stabilizers can be included with the stabilizer composition of this invention in amounts corresponding to 0.2 to about 20 parts by weight per 100 parts by weight of polymer being stabilized. Typical 1,2-epoxide stabilizers are epoxidized polybutadiene, epoxysoybean oil, epoxylinseed oil, and 2-ethylhexyl epoxystearate. The epoxide stabilizer can have one or a plurality of oxirane or 1,2-epoxide groups and from 15 to 150 carbon atoms. A comprehensive disclosure of epoxide stabilizers at column 26 lines 12 to 40 and column 27 lines 17 to 51 of M. Minagawa U.S. Pat. No. 3,869,423 is here incorporated by reference.

The esters, amides, and hydrazides of thiodialkylene dicarboxylic acids and nitrilotri-alkylenetricarboxylic acids can be included with the stabilizer composition of this invention in amounts corresponding to 0.1 to about 1 part per 100 parts of polymer. Typical of these are dimethyl thiodipropionate, dilauryl and distearyl thiodipropionates, 2,2'-thiobis(acetyl ethanolamine), 3,3'-thiobis(propionyldiisopropanolamine, nitrilotriacetic acid (NTA) propylene glycol ester, NTA tris (ethylamide), NTA bis(hydroxyethyl) N-butylamide, 3,3'-thiodipropionyldihydrazide and 6,6'-thiodihexanoyldihydrazide. A comprehensive disclosure of thiodipropionate compounds that can be used from column 21 line 9 to column 22 line 65 of M. Minagawa U.S. Pat. No. 3,849,370 is here incorporated by reference.

Ketoacetic acid compounds that can be used with the stabilizer compositions of this invention in amounts of about 0.05 to about 0.5 parts per 100 parts of polymer being stabilized include 2-ethylhexyl acetoacetate, glyceryl tris(acetoacetate) and dehydroacetic acid. A comprehensive disclosure of ketoacetic acid compounds that can be used from column 2 line 32 to column 5 line 10 U.S. Pat. No. 3,346,536 issued Oct. 10, 1967 is here incorporated by reference.

Organic nitrogen compounds that can be used with the stabilizer compositions of this invention in amounts of about 0.05 to about 0.5 parts per 100 parts of polymer being stabilized include 2- ethylhexyl 3-aminocrotonate, 1,4-butanediol bis(3-aminocrotonate) and 2,2'-thiodiethyl 3-aminocrotonate; thiocarbanilide and 2-phenylindole, 1,3-dibutylthiourea, phenylurea, and p-ethoxyphenylurea.

Stabilizer compositions in accordance with this invention can be in solid, liquid or paste form. Liquid compositions can be prepared by blending the ingredients and heating at 40 to 200° C. for up to 6 hours to achieve visual homogeneity and storage stability. Inert ingredients that can be added to the stabilizer compositions to improve their handling convenience include solvents such as hydrocarbons, 2-ethylhexanol, isodecyl alcohol, 2-ethoxyethanol, and 2(2-butoxyethoxy)ethanol; paste consistency modifiers such as finely divided silica, polyethylene glycols and polypropylene glycols and their monoalkyl and monaryl ethers, and water; anticaking agents such as talc, magnesium trisilicate, sodium silicoaluminate, and aluminum calcium silicate. The following are non-limiting examples of liquid stabilizer compositions that can be prepared in accordance with this invention:

| No. | Ingredients | Grams | Heated at ° C | Hours |
|---|---|---|---|---|
| I | Diphenyl isooctylphosphite | 40 | 80° | 1 |
|  | Barium nonylphenate | 15 |  |  |
|  | Zinc 2-ethylhexoate | 10 |  |  |
|  | 2-ethoxyethanol | 5 |  |  |
|  | Aromatic naphtha b.p. 160-190° C | 18 |  |  |
|  | Glycerol monobenzoate | 12 |  |  |
| II | Epoxysoybean Oil | 70 | 80° | 1 |
|  | Tris(nonylphenyl phosphite) | 25 |  |  |
|  | Trimethylolpropane monophthalate | 5 |  |  |
| III | Diphenyl isodecyl phosphite | 50 | 120° | 1 |
|  | Calcium 2-ethylhexoate | 20 |  |  |
|  | Stannous neodecanoate | 15 |  |  |
|  | Pentaerythritol mono(2,4-dichlorophenylacetate) | 15 |  |  |

The following are non-limiting examples of solid stabilizer compositions that can be prepared in accordance with this invention:

| No. | Ingredients | Grams |
|---|---|---|
| IV | Barium stearate | 47 |
|  | Zinc laurate | 40 |
|  | Bis(pentaerythritol) isophthalate | 13 |
| V | Calcium stearate | 44 |
|  | Zinc stearate | 44 |
|  | Bisphenol A | 2 |
|  | Bis (pentaerythritol) terephthalate | 10 |
| VI | Zinc benzoate | 21 |
|  | Strontium stearate | 72 |
|  | Tris(pentaerythritol) trimellitate | 7 |

The following are non-limiting examples of paste stabilizers compositions that can be prepared in accordance with this invention:

| No. | Ingredients | Grams |
|---|---|---|
|  | Epoxylinseed oil | 65 |
|  | Zinc Palmitate | 15 |
|  | Magnesium palmitate | 8 |
| VII | Epoxysoybean oil | 70 |
|  | BHT antioxidant | 5 |
|  | Cadmium stearate | 10 |
|  | Glycerol mono-3-benzyl-thiopropionate | 15 |
| VIII | 2-Ethylhexyl epoxystearate | 60 |
|  | Distearyl pentaerythritol diphosphite | 12 |
|  | Zinc myristate | 12 |
|  | Bis(mannitol)isophthalate | 10 |
|  | Fumed silica | 5.75 |
|  | Polyethylene glycol 400 | 0.25 |

The preparation of the stabilized polymer composition is easily accomplished by conventional procedures. The selected stabilizer combination along with such compounding ingredients as plasticizers, colors, lubricants, antistatic agents etc. as may be needed, is blended with the polymer being stabilized, using, for instance, plastic mixing rollers, at a temperature at which the mix is fluid and thorough blending facilitated, typically at from 250 to 350° F. for a time sufficient to form a homogeneous sheet, five minutes, usually. After the mass is formed, it is sheeted off in the usual way.

The following examples in the opinion of the inventors represent preferred embodiments of their invention.

EXAMPLE 1

In order to examine the stabilizing effect of the composition of this invention, a plasticized PVC, 1 mm in thickness was prepared by a milling process on a two-roll mill according to the following formulation, and the examinations of heat stability at 175° C., initial color and clarity were carried out.

The results are shown in Table-1.

(Formulation)
| | | |
|---|---|---|
| Polyvinyl chloride resin | 100 | parts by weight |
| Di octyl phthalate | 47 | |
| Epoxidized soybean oil | 3 | |
| Calcium stearate | 1.0 | |
| Zinc stearate | 1.0 | |
| Trisnonylphenylphosphite | 1.0 | |
| Polyol aromatic carboxylic acid ester (Table-1) | 0.5 | |

Clarity was rated on a scale from 1 to 10 on which 1 represents the clarity of crystal glass and 10 is opaque.

Initial color was rated by comparing each sample to the indicated base formulation of the Example, (here Table 1, Example 1-1) on a scale of medium, or equivalent to the base formulation superior, or 15 minutes later onset of yellowing than the base formulation, excellent, or 30 minutes later onset of yellowing than the base formulation, and very excellent, or more than 30 minutes later onset of yellowing than the base formulation; initial color poorer than that of the base formulation in Example 1-1 was rated inferior. Heat stability was expressed in minutes of oven aging to a dark brown or black failure point.

TABLE I

| Example No. | Aromatic Carboxylic Acid Ester | Heat Stability (175° C) | Initial Color | Clarity |
|---|---|---|---|---|
| 1-1 | None | 75 min. | Medium | 4 |
| 1-2 | di(pentaerythritol) phthalic acid ester | >120 | Excellent | 3 |
| 1-3 | pentaerythritol benzoic acid mono ester | 120 | Excellent | 3 |
| 1-4 | tetra(pentaerythritol) pyromellitic acid ester | >120 | Excellent | 2 |
| 1-5 | sorbitol benzoic acid mono ester | >120 | Excellent | 4 |
| 1-6 | tri(pentaerythritol) trimellitic acid ester | >120 | Excellent | 2 |
| 1-7 | glycerin benzoic acid mono ester | 120 | Excellent | 3 |
| 1-8 | pentaerythritol p-t-butyl-benzoic acid mono ester | 120 | Excellent | 3 |
| 1-9 | pentaerythritol 3,5-di-t-butyl-4-hydroxybenzoic acid monoester | >120 | Excellent | 3 |
| 1-10 | pentaerythritol phenyl-acetic acid mono ester | >120 | Excellent | 4 |
| 1-11 | pentaerythritol salicyclic acid mono ester | >120 | Excellent | 3 |
| 1-12 | di(sorbitol)phthalic acid ester | >120 | Excellent | 4 |
| 1-13 | di(mannitol)phthalic acid ester | >120 | Excellent | 3 |
| 1-14 | mono(pentaerythritol) phthalic acid ester | >120 | Excellent | 3 |
| Comparison Ex. | Pentaerythritol | 105 | Excellent | 5 |

The results of the tests recorded in Table 1 show that stabilizer compositions according to this invention are better than a control composition lacking an essential ingredient in initial color and heat stability and in certain cases also in clarity, of plasticized PVC compositions containing them.

EXAMPLE 2

In order to examine the stabilizing effect of the composition of the invention, the examinations were carried out in the same way as in Example 1 according to the following rigid PVC formulation.

The results are shown in Table 2.

(Formulation)
| | | |
|---|---|---|
| Polyvinylchloride resin | 100 | parts by weight |
| HiMic 1080 (Lubricant) | 0.7 | |
| PEP-2(phosphite antioxidant made by Adeka-Argus Co., Ltd) | 0.4 | |
| Calcium stearate | 1.2 | |
| Zinc stearate | 0.3 | |
| Magnesium stearate | 0.3 | |
| BHT | 0.1 | |
| Polyol aromatic carboxylic acid ester (Table 2) | 0.5 | |

TABLE 2

| Example Number | Polyhydric Alcohol Aromatic Carboxylic Acid Ester | Initial Color | Heat Stability (175° C) |
|---|---|---|---|
| 2-1 | None | Inferior | 45 min. |
| 2-2 | sorbitol benzoic acid mono-ester | superior | >120 |
| 2-3 | di(pentaerythritol)phthalic acid ester | superior | >120 |
| 2-4 | tri(pentaerythritol)tri-mellitic acid ester | superior | 120 |
| 2-5 | glycerin benzoic acid monoester | superior | 120 |
| 2-6 | mono(pentaerythritol)phthalic acid ester | superior | >120 |
| 2-7 | pentaerythritol benzoic acid monoester | superior | >120 |
| 2-8 | pentaerythritol 3,5-di-t-butyl-4-hydroxybenzoic acid monoester | superior | >120 |
| 2-9 | pentaerythritol salicyclic acid ester | superior | 120 |
| 2-10 | di(sorbitol)terephthalic acid ester | superior | >120 |
| 2-11 | 2,2,6,6-tetramethylolcyclo-hexanol benzoic acid monoester | superior | >120 |
| 2-12 | tetra(sorbitol)pyromellitic acid ester | superior | >120 |
| 2-13 | mannitol benzoic acid mono-ester | superior | >120 |
| 2-14 | di(mannitol)phthalic acid ester | superior | 120 |
| 2-15 | pentaerythritol phenoxy-acetic monoester | superior | 120 |
| Comparison Examples | | | |
| | pentaerythritol | superior | 105 min. |

The results of the tests recorded in Table 2 show that rigid PVC containing stabilizer compositions of this invention are superior in initial color and heat stability to PVC compositions lacking an essential ingredient thereof.

EXAMPLE 3

In order to examine the effects of the stabilizer composition of this invention including a Ba/Zn system stabilizer, the examination was carried out in the same way as Example 1 according to the following formulation.

The results are shown in Table 3.

(Formulation)
| | | |
|---|---|---|
| Polyvinylchloride resin | 100 | parts by weight |
| Zinc octoate | 0.5 | |
| Barium nonylphenolate | 1.5 | |
| Stearic acid | 1.0 | |
| Tetra($C_{12-15}$ mixed alkyl) | | |

-continued

| | bisphenol A diphosphite | 0.2 |
| | Polyol aromatic carboxylic acid ester (Table 3) | 0.3 |

TABLE 3

| Example Number | Polyol Aromatic Carboxylic Acid Ester | Heat Stability (175° C) | Clarity | Initial color |
|---|---|---|---|---|
| 3-1 | None | 45 | 4 | medium |
| 3-2 | di(pentaerythritol)phthalic ester | >120 | 3 | very excellent |
| 3-3 | pentaerythritol benzoic acid monoester | >120 | 3 | very excellent |
| 3-4 | sorbitol benzoic acid monoester | >120 | 3 | very excellent |
| 3-5 | pentaerythritol 3,5-di-t-butyl-4-hydroxybenzoic acid monoester | >120 | 3 | very excellent |
| 3-6 | pentaerythritol phenylacetic acid monoester | >120 | 4 | very excellent |
| 3-7 | di(sorbitol)terephthalic acid ester | >120 | 3 | very excellent |
| 3-8 | di(mannitol)phthalic acid ester | >120 | 3 | very excellent |
| 3-9 | tetra(sorbitol)pyromellitic acid ester | >120 | 4 | very excellent |
| 3-10 | mono(pentaerythritol)phthalic acid ester | >120 | 3 | very excellent |
| 3-11 | pentaerythritol phenoxypropionic acid monoester | >120 | 3 | very excellent |
| Comparison example: | | | | |
| | di(pentaerythritol)phthalic acid | | | |
| | pentaerythritol | 105 | 5 | excellent |

The results of the tests recorded in Table 3 show that the stabilizer composition of this invention with barium and zinc salts and aromatic carboxylic acid polyhydric alcohol ester provides PVC resin compositions of much improved heat stability and initial color, and in certain instances also improved clarity.

EXAMPLE 4

In order to examine the effects of the stabilizer composition of this invention on a polymer blend of polyvinylchloride resin and ABS resin, samples were prepared according to the following formulation and examined. The results are shown in Table 4.

(Formulation)

| Polyvinylchloride resin | 80 | parts by weight |
| ABS resin | 20 | |
| Ba/Zn Octoate liquid stabilizer | 2 | |
| Stearic acid | 0.5 | |
| Tetra(C$_{12-15}$ mixed alkyl) bis phenol A diphosphite | 0.2 | |
| Epoxidized soybean oil | 2.5 | |
| Polyol aromatic carboxylic acid ester (Table 4) | 0.5 | |

TABLE 4

| Example Number | Aromatic Carboxylic Acid Ester | Heat Stability (190° C) | Initial Color | Clarity |
|---|---|---|---|---|
| 4-1 | None | 60 min. | medium | 4 |
| 4-2 | di(pentaerythritol) phthalic acid ester | 120 | very excellent | 3 |
| 4-3 | pentaerythritol benzoic acid monoester | 105 | very excellent | 3 |
| 4-4 | sorbitol benzoic acid monoester | 120 | excellent | 4 |
| 4-5 | di(sorbitol)phthalic acid ester | 105 | very excellent | 3 |
| 4-6 | di(mannitol)phthalic acid ester | 120 | very excellent | 3 |
| 4-7 | mono(pentaerythritol) phthalic acid ester | 120 | very excellent | 4 |
| 4-8 | tetra(sorbitol)pyromellitic acid ester | 105 | very excellent | 3 |
| 4-9 | mannitol benzoic acid ester | 105 | excellent | 3 |
| 4-10 | tri(pentaerythritol) trimellitic acid ester | 120 | excellent | 3 |
| 4-11 | glycerin benzoic acid ester | 105 | very excellent | 4 |
| 4-12 | pentaerythritol 3,5-di-t-butyl-4-hydroxybenzoic acid monoester | 120 | very excellent | 3 |
| 4-13 | pentaerthritol phenylacetic acid monoester | 120 | very excellent | 4 |
| 4-14 | 2,2,6,6-tetramethylolcyclohexanol benzoic acid monoester | 120 | very excellent | 3 |
| Comparison example: | | | | |
| | sorbitol | 105 min. | inferior | 3 |
| | pentaerythritol | 90 | excellent | 5 |

The results of the tests recorded in Table 4 show that the stabilizer composition of this invention with barium and zinc salts and aromatic carboxylic acid polyhydric alcohol ester provides PVC/ABS polymer blend compositions of much improved heat stability and initial color, and in certain instances also improved clarity.

EXAMPLE 5

In order to examine the effects of the stabilizer system of this invention in an ethylene/vinylacetate/vinylchloride graft-copolymer, samples were prepared in the same way as Example 1 according to the following formulation and examined.

The results are shown in Table 5.

(Formulation)

| Ethylene-vinylacetate-vinylchloride graft-copolymer | 100 | parts by weight |
| Ca stearate | 0.4 | |
| Zn isostearate | 0.2 | |
| Trisnonylphenylphosphite | 1.0 | |
| Epoxidized soybean oil | 3.0 | |
| Polyol aromatic carboxylic acid ester (Table 5) | 0.5 | |

TABLE 5

| Example Number | Polyol Aromatic Carboxylic Acid Ester | Heat Stability (190° C) | Initial Color |
|---|---|---|---|
| 5-1 | None | 50 min. | Medium |
| 5-2 | sorbitol benzoic acid monoester | 105 | very excellent |
| 5-3 | di(pentaerythritol)phthalic | | very |

| | -continued | | |
|---|---|---|---|
| 5-4 | acid ester<br>tri(pentaerythritol)tri- | 105 | excellent<br>very |
| | mellitic acid ester | 90 | excellent |
| 5-5 | glycerin p-t-<br>butylbenzoic acid monoester | 90 | excellent |
| 5-6 | pentaerythritol benzoic<br>acid monoester | 105 | very<br>excellent |
| 5-7 | di(sorbitol)terephthalic<br>acid ester | 105 | very<br>excellent |
| 5-8 | mannitol benzoic acid<br>monoester | 105 | very<br>excellent |
| 5-9 | pentaerythritol phenylmer-<br>captopropionic acid monoester | 105 | very<br>excellent |
| Comparison example: | | | |
| | sorbitol | 90 min. | medium |

The results of the tests recorded in Table 5 show that the stabilizer composition of this invention with calcium and zinc salts and aromatic carboxylic acid polyhydric alcohol ester provides ethylene-vinyl acetate-vinyl chloride graft copolymer compositions of much improved heat stability and initial color compared to a control composition not containing an essential ingredient thereof.

EXAMPLE 6

In order to examine the excellent stabilizing effect of the aromatic carboxylic acid ester derivatives of polyhydric alcohols with an organotin compound according to this invention in a halogen-containing resin, samples were prepared in the same way as Example 1 according to the following formulation and tested.

The results are shown in Table 6.

| (Formulation) | |
|---|---|
| Polyvinylchloride resin | 100 parts by weight |
| Dioctyltinbis(butylmaleate) | 1.5 |
| Stearic acid | 0.5 |
| Polyol aromatic carboxylic acid ester (Table 6). | 0.5 |

TABLE 6

| Example Number | Polyol Aromatic Carboxylic Acid Ester | Heat Stability (175° C) | Initial Color | Clarity |
|---|---|---|---|---|
| 6-1 | None | 75 min | medium | 5 |
| 6-2 | di(pentaerythritol)phthalic acid ester | >120 | very excellent | 2 |
| 6-3 | pentaerythritol phthalic acid monoester | >120 | very excellent | 3 |
| 6-4 | sorbitol benzoic acid monoester | >120 | very excellent | 2 |
| 6-5 | di(sorbitol)phthalic acid ester | >120 | very excellent | 3 |
| 6-6 | glycerin benzoic acid monester | >120 | very excellent | 3 |
| 6-7 | pentaerythritol p-t-butyl-benzoic acid monoester | 120 | very excellent | 2 |
| 6-8 | pentaerythritol 3,5-di-t-butyl-4-hydroxybenzoic acid | 120 | very excellent | 3 |
| 6-9 | di(mannitol)phthalic acid ester | >120 | very excellent | 4 |
| 6-10 | pentaerythritol phenoxy-acetic acid monoester | >120 | very excellent | 3 |
| 6-11 | mono(pentaerythritol)phthalic acid ester | 120 | very excellent | 3 |
| 6-12 | mono(sorbitol)trimellitic acid ester | >120 | very excellent | 3 |
| 6-13 | 2-methyl-2-hydroxymethyl-1,3-propandiol monobenzoate | >120 | very excellent | 3 |
| 6-14 | mono(trimethylolethan)tere-phthalic acid ester | 120 | very excellent | 3 |
| Comparison Example: | | | | |
| | pentaerythritol | 90 | excellent | 5 |

The results of the tests recorded in Table 6 show that the stabilizer composition of this invention with organotin carboxylate and aromatic carboxylic acid polyhydric alcohol ester provides rigid organotin-stabilized PVC much improved in heat stability, initial color, and clarity over a control composition lacking the aromatic carboxylic acid polyhydric alcohol exter.

EXAMPLE 7

In order to examine the stabilizing effect of the composition of this invention together with other additives samples were prepared in the same way as Example 1 according to the following formulation and tested.

The results are shown in Table 7.

| (Formulation) | |
|---|---|
| Polyvinylchloride | 100 parts by weight |
| DOP | 50 |
| Zinc stearate | 1.0 |
| Calcium stearate | 1.0 |
| Di(pentaerythritol)tere-phthalic acid ester | 0.5 |
| Other additives (Table 7) | 0.3 |

TABLE 7

| Number | Other Additives | Heat Stability (190°) | Initial Color | Clarity |
|---|---|---|---|---|
| 7-1 | None | 60 min. | medium | 4 |
| 7-2 | dilaurylthiodipropionate | 105 | excellent | 3 |
| 7-3 | 2,6-di-t-butyl-p-cresol | 120 | excellent | 3 |
| 7-4 | epoxidized polybutadiene | 105 | very excellent | 2 |
| 7-5 | trisnonylphenylphosphite | 120 | very excellent | 3 |
| 7-6 | epoxidized soybean oil | 120 | excellent | 3 |
| 7-7 | dehydroacetic acid | 120 | very excellent | 3 |
| 7-8 | diphenylthiourea | 105 | excellent | 3 |
| 7-9 | thiodipropionic acid dihydrazide | 105 | excellent | 3 |
| 7-10 | 1,4-butandiol amino crotonate diester | 105 | excellent | 3 |
| 7-11 | nitrilo-triacetic acid tributylamide | 120 | very excellent | 2 |
| 7-12 | phenothiazine | 105 | excellent | 3 |
| 7-13 | 2-phenylindole | 105 | excellent | 3 |
| 7-14 | hydrogenated bisphenol A polyphosphite | 105 | excellent | 3 |
| 7-15 | octyldiphenylphosphite | 105 | excellent | 3 |
| 7-16 | thiodipropionic aid | 120 | excellent | 3 |

| 7-17 | BHT | 120 | excellent | 3 |

The results of these tests show the further improvement obtainable by including the additives shown in Table 7 in a stabilizer composition according to this invention.

We claim:

1. A stabilizer composition for enhancing the resistance to discoloration and loss of clarity of a vinyl chloride polymer when heated at 175° C., comprising (A) at least one metal salt of a non-nitrogenous monocarboxylic acid having 6 to 24 carbon atoms or a hydrocarbon-substituted phenol having 10 to 30 carbon atoms and (B) at least one aromatic carboxylic acid ester of a polyhydric alcohol having one to four carboxylic acid ester groups and at least two free alcoholic hydroxyl groups in a carboxylic acid polyhydric alcohol ester group, the ester being represented by the formula:

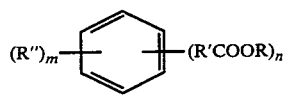

in which R is a hydroxyhydrocarbon group having 2 to 5 alcoholic hydroxyl groups and 3 to 10 carbon atoms; R' is a bivalent linking group that can be a single bond, an alkylene group, an ether alkylene group, and a thioalkylene having 1 to 3 carbon atoms; R" is an inert substituent that can be a halogen atom, a lower alkyl group, a lower alkoxyl group, a hydroxyalkyleneoxy group having 2 to 3 carbon atoms, a carboxyl group, a carboxylalkyl group, an amino group, and a carbamoyl group; m is an integer from zero to 5; n is an integer from 1 to 4, and the sum of m + n cannot exceed 6.

2. A stabilizer composition according to claim 1 in which the metal salt is a salt of the metals barium, calcium, cadmium, dialkyltin, magnesium, strontium, tin, and zinc.

3. A stabilizer composition according to claim 1 in which the salt is a salt of 2-ethylhexoic acid, neodecanoic acid, lauric acid, stearic acid, or nonylphenol.

4. A stabilizer composition according to claim 1 in which the aromatic carboxylic acid polyhydric alcohol ester has two polyhydric alcohol ester groups.

5. A stabilizer composition according to claim 1 in which the aromatic carboxylic acid ester has one polyhydric alcohol ester group.

6. A stabilizer composition according to claim 1 in which the aromatic carboxylic acid polyhydric alcohol ester is an ester of pentaerythritol.

7. A stabilizer composition according to claim 1 in which the aromatic carboxylic acid polyhydric alcohol ester is an ester of terephthalic acid.

8. A stabilizer composition according to claim 1 comprising as an additional ingredient a compound selected from the group consisting of 1,2-epoxides; hindered phenols; organic phosphites; thioethers and thioether carboxylic acids; esters, amides and hydrazides of thiodialkylenedicarboxylic, 3-aminocrotonic, and nitrilotrialkylenetricarboxylic acids; ketoacetic acid compounds; diphenyl thiourea, and 2-phenylindole.

9. A stabilizer composition according to claim 1 in which m is zero, n is 2, and R' is a single bond.

10. A stabilized vinyl chloride polymer composition comprising a vinyl chloride polymer and a stabilizer composition according to claim 1.

11. A stabilizer vinyl chloride polymer composition according to claim 10 in which the vinyl chloride polymer is homopolymer of vinyl chloride.

12. A stabilized vinyl chloride polymer composition according to claim 10 in which the vinyl chloride polymer is a copolymer of vinyl chloride and a co-monomer selected from the group consisting of propylene, ethylene, 1-butene, 1-hexene, vinyl acetate, acrylonitrile, and diethyl maleate.

13. A stabilized vinyl chloride polymer composition comprising a vinyl chloride polymer and a stabilizer composition according to claim 1.

14. A stabilized vinyl chloride polymer composition according to claim 13 in which the vinyl chloride polymer is homopolymer of vinyl chloride.

15. A stabilized vinyl chloride polymer composition according to claim 13 in which the vinyl chloride polymer is a copolymer of vinyl chloride and a co-monomer selected from the group consisting of propylene, ethylene, 1-butene, 1-hexene, vinyl acetate, acrylonitrile, and diethyl maleate.

* * * * *